US012656715B2

(12) United States Patent
Miyashita

(10) Patent No.: US 12,656,715 B2
(45) Date of Patent: Jun. 16, 2026

(54) FIXING DEVICE

(71) Applicant: TOSHIBA TEC KABUSHIKI KAISHA, Tokyo (JP)

(72) Inventor: Kousei Miyashita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/897,693

(22) Filed: Sep. 26, 2024

(65) Prior Publication Data

US 2025/0377619 A1 Dec. 11, 2025

(30) Foreign Application Priority Data

Jun. 6, 2024 (JP) ................................ 2024-092628

(51) Int. Cl.
*G03G 15/20* (2006.01)

(52) U.S. Cl.
CPC ..... *G03G 15/2064* (2013.01); *G03G 15/2053* (2013.01); *G03G 2215/00413* (2013.01)

(58) Field of Classification Search
CPC ........... G03G 15/2017; G03G 15/2032; G03G 15/2053; G03G 15/2064
See application file for complete search history.

(56) References Cited

U.S. PATENT DOCUMENTS 8,170,435 B2 5/2012 Ueno
2018/0081311 A1* 3/2018 Kawakami ......... G03G 15/2064
2021/0157258 A1* 5/2021 Saeki ................. G03G 15/2064
2023/0288849 A1 9/2023 Himeno
2023/0367247 A1 11/2023 Harashima

FOREIGN PATENT DOCUMENTS

JP 57-79977 5/1982
JP 2000-221828 8/2000
JP 2016-014774 1/2016

OTHER PUBLICATIONS

Extended European Search Report for European Patent Application No. 24202765.4 dated Mar. 10, 2025.

* cited by examiner

*Primary Examiner* — Thomas S Giampaolo, II
(74) *Attorney, Agent, or Firm* — Amin, Turocy & Watson, LLP

(57) ABSTRACT

According to one embodiment, a fixing device capable of extending a lifespan of a component is provided. A fixing device of an embodiment includes a cylindrical body, a pressure roller, an adjustment mechanism, and a control section. The pressure roller can come into contact with the cylindrical body to form a nip. The adjustment mechanism can adjust a pressing force of the pressure roller against the cylindrical body. The control section controls the adjustment mechanism so that a first pressing force is realized as the pressing force when the pressure roller rotates at a first speed. The control section controls the adjustment mechanism so that a second pressing force smaller than the first pressing force is realized as the pressing force when the pressure roller rotates at a second speed greater than the first speed.

17 Claims, 9 Drawing Sheets

FIXING DEVICE

CROSS-REFERENCE TO RELATED APPLICATION

This application is based upon and claims the benefit of priority from Japanese Patent Application No. 2024-092628, filed on Jun. 6, 2024, the entire contents of which are incorporated herein by reference.

FIELD

Embodiments described herein relate generally to a fixing device, an image forming apparatus, and a method for operating the fixing device.

BACKGROUND

An image forming apparatus is used to form an image on a sheet. The image forming apparatus has a fixing device that fixes toner to the sheet. The fixing device is required to have an extended component lifespan.

DETAILED DESCRIPTION

An aspect of an exemplary embodiment is to provide a fixing device capable of extending a lifespan of a component.

In general, according to one embodiment, a fixing device includes a cylindrical body, a pressure roller, an adjustment mechanism, and a control section. The pressure roller can come in contact with the cylindrical body to form a nip. The adjustment mechanism can adjust a pressing force of the pressure roller against the cylindrical body. The control section controls the adjustment mechanism so that a first pressing force is realized as the pressing force when the pressure roller rotates at a first speed. The control section controls the adjustment mechanism so that a second pressing force smaller than the first pressing force is realized as the pressing force when the pressure roller rotates at a second speed greater than the first speed.

Hereinafter, a fixing device according to an embodiment will be described with reference to the drawings.

Figure 1:
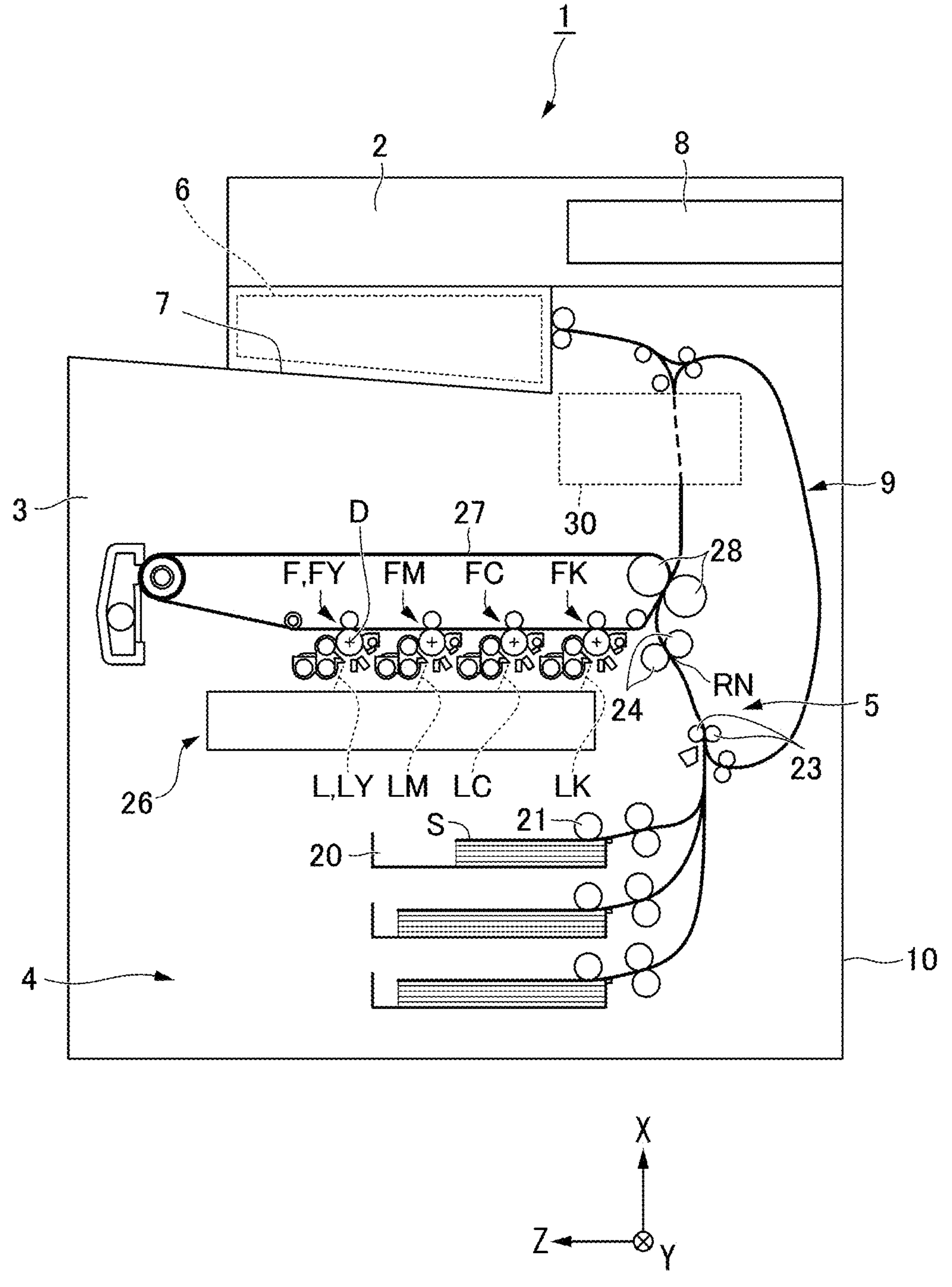
FIG. 1 is a schematic configuration diagram of an image forming apparatus.

FIG. 1 is a schematic configuration diagram of an image forming apparatus 1.

The image forming apparatus 1 performs a process of forming an image on a sheet S. The sheet may be paper. The image forming apparatus 1 has a housing 10, a scanner section 2, an image forming unit 3, a sheet supply section 4, a conveying section 5, a tray 7, a reversing unit 9, a control panel 8, and a control section 6.

The housing 10 forms an outer shape of the image forming apparatus 1.

The scanner section 2 reads image information of a copy target object based on brightness and darkness of light, and generates an image signal. The scanner section 2 outputs the generated image signal to the image forming unit 3.

The image forming unit 3 forms a toner image based on an image signal from the scanner section 2 or an external source. A toner image is an image formed with toner or other materials. The image forming unit 3 transfers the toner image onto a surface of the sheet S. The image forming unit 3 applies heat and pressure to the toner image on the surface of the sheet S to fix the toner image to the sheet S.

The sheet supply section 4 supplies sheets S one by one to the conveying section 5 in accordance with the timing at which the image forming unit 3 forms a toner image. The sheet supply section 4 has a sheet accommodation portion 20 and a pickup roller 21.

The sheet accommodation portion 20 accommodates sheets S of a predetermined size and type.

The pickup roller 21 picks up the sheets S one by one from the sheet accommodation portion 20. The pickup roller 21 supplies the picked-up sheets S to the conveying section 5.

The conveying section 5 conveys the sheet S supplied from the sheet supply section 4 to the image forming unit 3. The conveying section 5 has a conveying roller 23 and a registration roller 24.

The conveying roller 23 conveys the sheet S supplied from the pickup roller 21 to the registration roller 24. The conveying roller 23 abuts a leading edge of the sheet S in a conveying direction against a nip RN of the registration roller 24.

The registration rollers 24 bend the sheet S at the nip RN to adjust a position of the leading edge of the sheet S in the conveying direction. The registration rollers 24 conveys the sheet S according to the timing at which the image forming unit 3 transfers the toner image onto the sheet S.

The image forming unit 3 will be described.

The image forming unit 3 includes a plurality of image forming portions F, a laser scanning unit 26, an intermediate transfer belt 27, a transfer portion 28, and a fixing device 30.

The image forming portion F has a photoconductor drum D. The image forming portion F forms a toner image on the photoconductor drum D in response to an image signal. A plurality of image forming portions FY, FM, FC, and FK respectively form toner images using yellow, magenta, cyan, and black toners.

A charger charges a surface of the photoconductor drum D. A developer contains developing powders including yellow, magenta, cyan, and black toners. The developer develops an electrostatic latent image on the photoconductor drum D to form a toner image of each color on the photoconductor drum D.

The laser scanning unit 26 scans the charged photoconductor drum D with a laser light ray L to expose the photoconductor drum D. The laser scanning unit 26 exposes the photoconductor drum D of each of color image forming units FY, FM, FC, FK with the separate laser light rays LY, LM, LC, LK to form an electrostatic latent image on the photoconductor drum D.

The toner image on the surface of the photosensitive drum D is primarily transferred onto the intermediate transfer belt 27.

The transfer portion 28 transfers the toner image, which is primarily transferred onto the intermediate transfer belt 27, onto the surface of the sheet S at a secondary transfer position.

The fixing device 30 performs a fixing process on the sheet S. The fixing process is a process in which the toner image transferred to the sheet S is heated and pressurized to fix the toner image to the sheet S. The fixing device 30 will be described in detail below.

The reversing unit 9 inverts the sheet S to form an image on a back side of the sheet S. The reversing unit 9 inverts the sheet S discharged from the fixing device 30 by switching back. The reversing unit 9 transports the inverted sheet S toward the registration roller 24.

The tray 7 holds the sheet S on which an image is formed and discharged.

The control panel 8 is part of an input section into which an operator inputs information for operating the image forming apparatus 1. The control panel 8 has a touch panel and various hard keys.

The control section 6 controls each part of the image forming apparatus 1.

Figure 2:
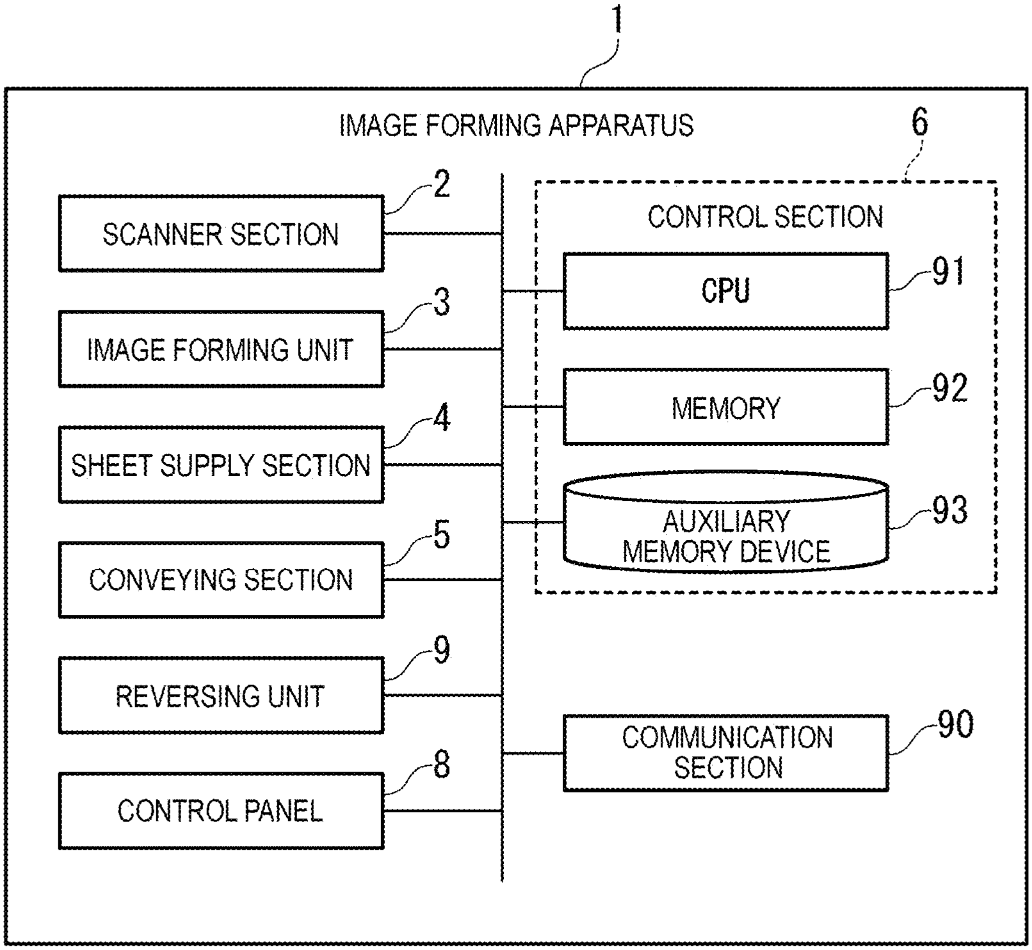
FIG. 2 is a hardware configuration diagram of the image forming apparatus.

FIG. 2 is a hardware configuration diagram of the image forming apparatus 1. The image forming apparatus 1 includes a Central Processing Unit (CPU) 91, a memory 92, an auxiliary memory device 93, and the like, which are connected by a bus, and executes a program. By executing the program, the image forming apparatus 1 functions as an apparatus including the scanner section 2, the image forming unit 3, the sheet supply section 4, the conveying section 5, the reversing unit 9, the control panel 8, and a communication section 90.

The CPU 91 functions as the control section 6 by executing programs stored in the memory 92 and the auxiliary memory device 93. The control section 6 controls an operation of each functional part of the image forming apparatus 1. The control section 6 controls an operation of the fixing device 30.

The auxiliary memory device 93 is configured using a memory device such as a magnetic hard disk device or a semiconductor memory device. The auxiliary memory device 93 stores information.

The communication section 90 includes a communication interface for connecting own device to an external device. The communication section 90 communicates with the external device via a communication interface.

The fixing device 30 will be described in detail.

Figure 3:
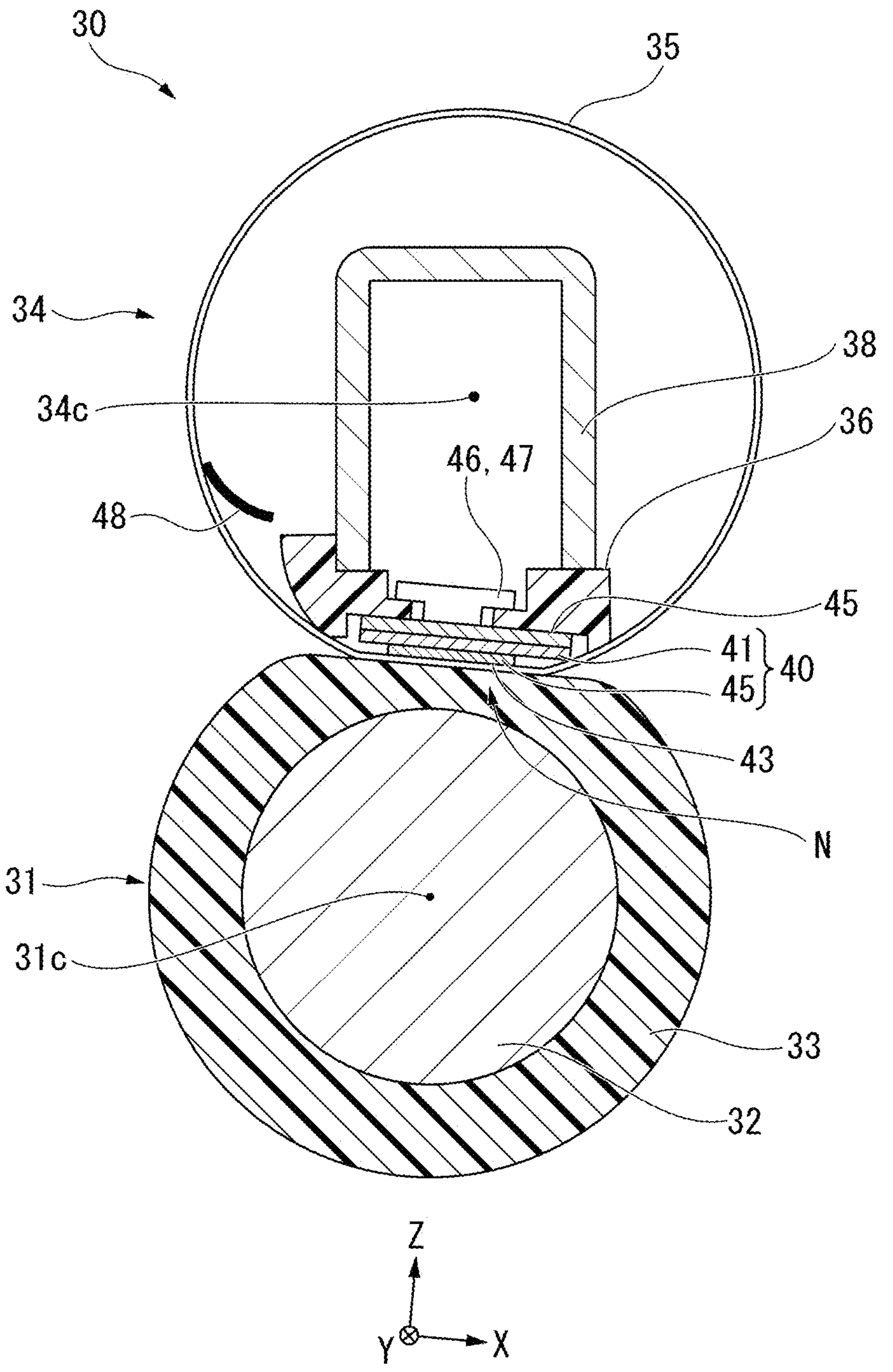
FIG. 3 is a front cross-sectional view of a fixing device in an embodiment.

FIG. 3 is a front cross-sectional view of the fixing device 30. The fixing device 30 has a pressure roller 31 and a heating roller 34. The pressure roller 31 can be in contact with the heating roller 34 to form a nip N.

In this application, a Z direction, an X direction, and a Y direction are defined as follows. The Z direction is a direction in which the heating roller 34 and pressure roller 31 are aligned. A +Z side is a side on which the heating roller 34 is positioned relative to the pressure roller 31. The X direction is the conveying direction of the sheet S in the nip N. The Y direction is an axial direction of a pressure roller rotation shaft 31*c*.

The heating roller 34 heats the toner image on the sheet S that enters the nip N. The heating roller 34 has a cylindrical film (cylindrical body) 35, a heat generating unit 40, a heat transfer member 45, a support member 36, a stay 38, and temperature-sensing elements 46, 47, and 48. A configuration of the heating roller 34 is not limited to the above, and various configurations are possible.

The cylindrical film 35 is cylindrical. The cylindrical film 35 has, in order from an inner periphery side, a base layer, an elastic layer, and a release layer. The base layer is formed of a resin material such as polyimide (PI) to reduce heat capacity. The base layer may be formed of a metal material such as nickel (Ni). The elastic layer is formed of an elastic material such as silicone rubber. The release layer is formed of a material such as tetrafluoroethylene-perfluoroalkyl vinyl ether copolymer (PFA) resin.

The heat generating unit 40 is located inside the cylindrical film 35. A first surface 43 on the +Z side of the heat generating unit 40 is in contact with an inner surface of the cylindrical film 35 via grease. The heat generating unit 40 has a substrate 41 and a heating element 42.

The substrate 41 is formed of a metal material such as stainless steel or a ceramic material such as aluminum nitride. The substrate 41 is formed into an elongated, thin rectangular plate. A longitudinal direction of the substrate 41 is the Y direction, and a transverse direction is the X direction.

The heating element 42 is made of a silver-palladium alloy or the like. The heating element 42 generates heat when electricity is applied. The heating element 42 is disposed on the +Z side of the substrate 41.

The heat transfer member 45 is formed from a metal material with high thermal conductivity, such as copper. The heat transfer member 45 is in contact with a second surface on a −Z side of the heat generating unit 40. The heat transfer member 45 is formed from a material with a higher thermal conductivity than the substrate 41 of the heat generating unit 40. The heat transfer member 45 levels out temperature distribution in the Y direction of the heat generating unit 40.

The support member 36 is formed from a resin material such as liquid crystal polymer. The support member 36 is arranged so as to cover the −Z side and both sides in the X direction of the heat generating unit 40. The support member 36 supports the heat generating unit 40 in the Z direction via the heat transfer member 45. The support member 36 supports an inner peripheral surface of the cylindrical film 35 on both sides in the X direction of the heat generating unit 40.

The stay 38 is formed from a steel plate material or the like. A cross section of the stay 38 perpendicular to the Y direction is U-shaped. The stay 38 is attached to the −Z side of the support member 36 so that a U-shaped opening is blocked by the support member 36. The stay 38 extends in the Y direction. Both ends of the stay 38 in the Y direction are fixed to the housing 10 of the image forming apparatus 1.

The temperature sensing elements 46, 47, and 48 are a heater thermometer 46, a thermostat 47, and a film thermometer 48. The heater thermometer 46 and the thermostat 47 are on the −Z side of the heat generating unit 40. The heater thermometer 46 measures the temperature of the heat generating unit 40 via the heat transfer member 45. The thermostat 47 cuts off the flow of electricity to the heating element 42 when the temperature of the heat generating unit 40 exceeds a predetermined temperature.

The film thermometer 48 measures the temperature of the cylindrical film 35. The film thermometer 48 outputs a signal corresponding to the temperature of the cylindrical film 35 to the control section 6. The control section 6 controls the supply of electricity to the heating element 42 of the heat generating unit 40 based on the temperature of the cylindrical film 35. In this way, the control section 6 controls the fixing temperature of the nip N.

The pressure roller 31 applies pressure to the toner image on the sheet S that enters the nip N. The pressure roller 31 has a core metal 32 and an elastic layer 33. The configuration of the pressure roller 31 is not limited to the above, and various configurations are possible.

The core metal 32 is formed in a cylindrical shape from a metal material such as stainless steel. The elastic layer 33 is formed from an elastic material such as silicone rubber. The elastic layer 33 is disposed on an outer peripheral surface of the core metal 32. A release layer made of a resin material such as PFA may be provided on an outer peripheral surface of the elastic layer 33.

Figure 4:
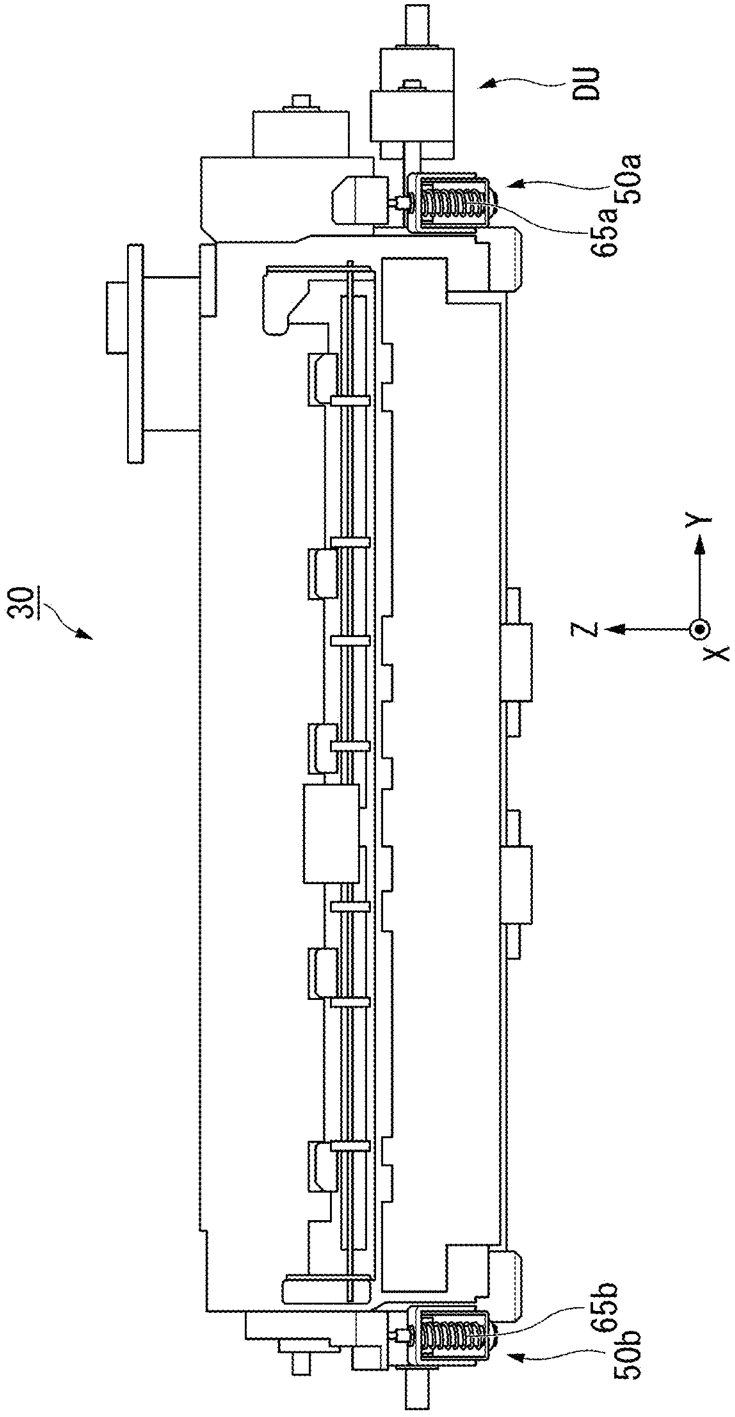
FIG. 4 is a plan view of the fixing device.

FIG. 4 is a plan view of the fixing device 30. The fixing device 30 has a drive unit DU for the pressure roller 31. The drive unit DU is arranged only on the +Y side (first side) of the pressure roller 31. For example, the +Y side is a rear side of the image forming apparatus 1. The drive unit DU drives the pressure roller 31 to rotate by a motor or the like. When the pressure roller 31 rotates with the nip N formed, the cylindrical film 35 of the heating roller 34 rotates accordingly. The pressure roller 31 conveys the sheet S in the X direction by rotating with the sheet S in the nip N.

An adjustment mechanism 50 will be described in detail.

Figure 5:
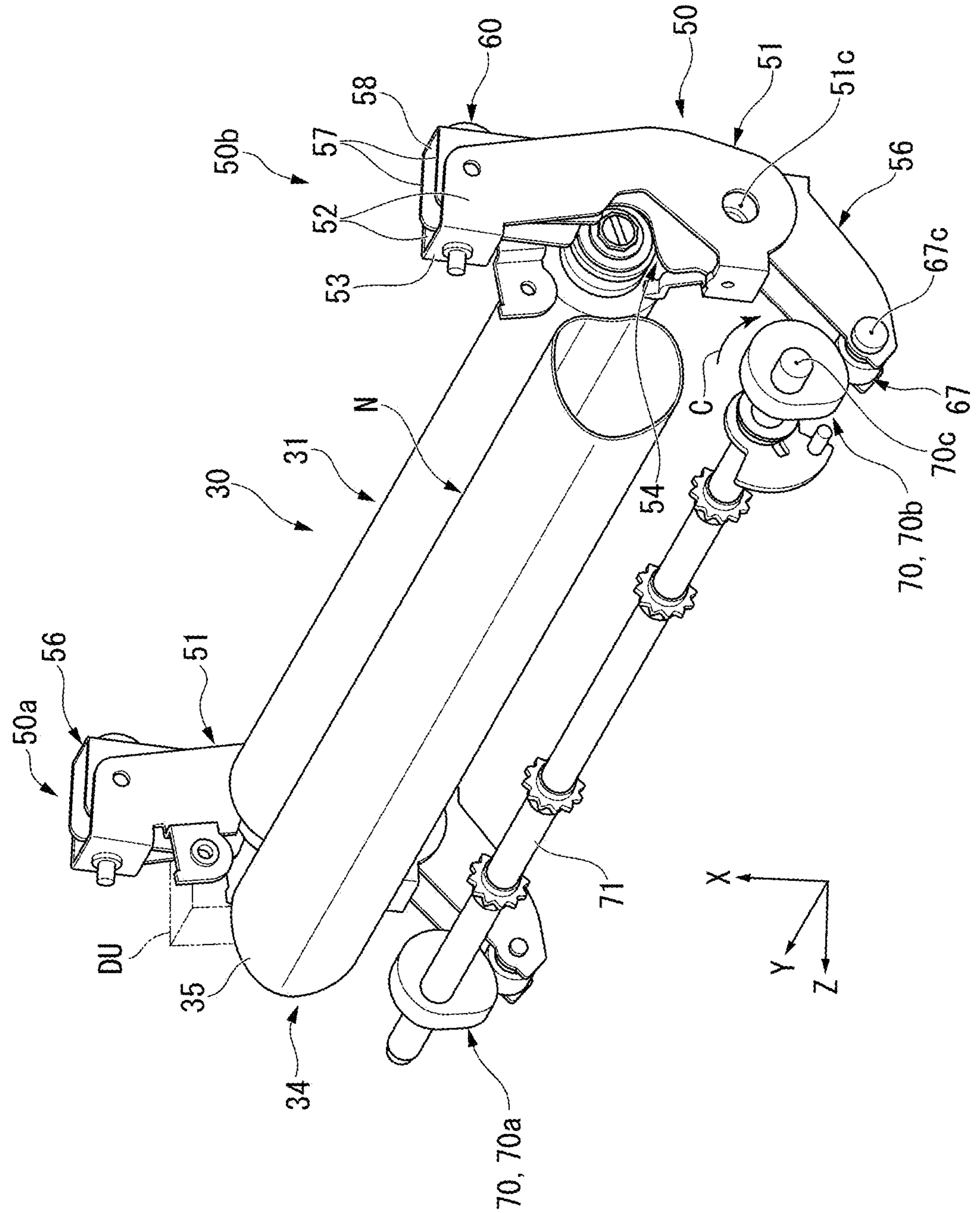
FIG. 5 is a perspective view of an adjustment mechanism.

FIG. 5 is a perspective view of the adjustment mechanism 50. In FIG. 5, the members inside the cylindrical film 35 are omitted. The adjustment mechanism 50 makes the pressure roller 31 separate from and comes into contact with the heating roller 34. The adjustment mechanism 50 makes the pressure roller 31 separate from the heating roller 34 when the sheet S jams in the fixing device 30 or when the fixing device 30 is in a sleep state. When the pressure roller 31 comes into contact with the heating roller 34, the nip N is formed between the two. The fixing device 30 heats and pressurizes the toner image of the sheet S that enters the nip N, fixing the toner image to the sheet S. The adjustment mechanism 50 can adjust a pressing force of the pressure roller 31 against the cylindrical film 35.

The adjustment mechanism 50 has a first adjustment mechanism **50*a* and a second adjustment mechanism 50*b*. The first adjustment mechanism 50*a* is arranged on the +Y side of the pressure roller 31. The first adjustment mechanism 50*a* adjusts a pressing force of the +Y side of the pressure roller 31 against the cylindrical film 35. A side opposite to the +Y side in the Y direction is a −Y side (second side). The second adjustment mechanism 50*b* is arranged on the −Y side of the pressure roller 31. The second adjustment mechanism 50*b* adjusts a pressing force of the −Y side of the pressure roller 31 against the cylindrical film 35**.

The first adjustment mechanism **50*a* and the second adjustment mechanism 50*b* each have an arm 51, a pusher 56, an elastic member 65, a cam follower 67, and a cam 70. The first adjustment mechanism 50*a* and the second adjustment mechanism 50*b* are connected by a camshaft 71. The first adjustment mechanism 50*a* and the second adjustment mechanism 50*b* are linked by pivot of the camshaft 71. The first adjustment mechanism 50*a* and the second adjustment mechanism 50*b* are approximately plane-symmetric with respect to an XZ plane that passes through a center point of the pressure roller 31** in the Y direction.

The arm 51 is formed from a steel plate material or the like. The arm 51 extends along the X direction. The arm 51 is pivotable around an arm rotation shaft **51*c*. The arm rotation shaft 51*c* is parallel to the Y direction and is located near a −X side end of the arm 51**.

The arm 51 has an arm body plate 52 and an arm connecting portion 53.

The arm body plate 52 is parallel to the XZ plane. A pair of arm body plates 52 and 52 are arranged to be spaced apart in the Y direction. The arm body plate 52 closest to the pressure roller 31 has a pressure roller support portion 54. The pressure roller support portion 54 is in a center of the arm body plate 52 in the X direction, at an end on the +Z side. The pressure roller support portion 54 is a semicircular notch. The pressure roller support portion 54 rotatably supports the pressure roller 31.

The arm connecting portion 53 connects +Z side ends of the pair of arm body plates 52 and 52 to each other. The arm connecting portions 53 are located at both ends of the arm 51 in the X direction.

The pusher 56 is formed from a steel plate material or the like. The pusher 56 is pivotable around the arm rotation shaft **51*c*. The arm rotation shaft 51*c* is located in a middle of the pusher 56 in the X direction. One side of the pusher 56 extends from the arm rotation shaft 51*c* to the +X side. The other side of the pusher 56 extends from the arm rotation shaft 51*c*** to the −X side and +Z side.

The pusher 56 has a pusher body plate 57 and a pusher connecting portion 58.

The pusher body plate 57 is parallel to the XZ plane. A pair of pusher body plates 57 and 57 are arranged to be spaced apart in the Y direction. The pair of pusher body plates 57 and 57 are located inside the pair of arm body plates 52 and 52 in the Y direction.

The pusher connecting portion 58 connects −Z side ends of the pair of pusher body plates 57 and 57 to each other.

Figure 6:
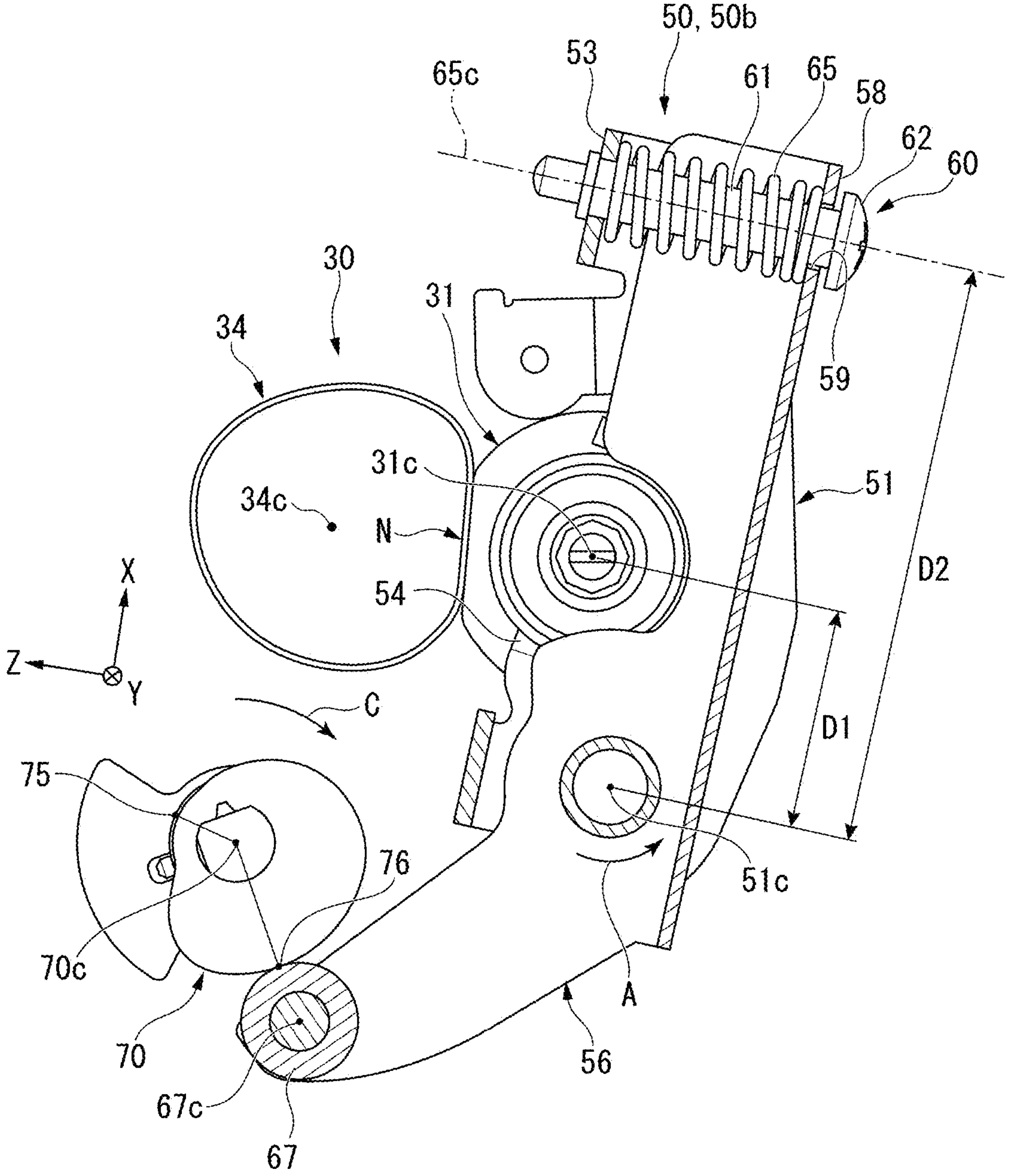
FIG. 6 is a front cross-sectional view of a second adjustment mechanism.

FIG. 6 is a front cross-sectional view of the second adjustment mechanism **50*b*. FIG. 6 is a cross-sectional view perpendicular to the Y direction at a middle part of the pusher 56 in the Y direction. In FIG. 6, the members inside the cylindrical film 35 are omitted. The adjustment mechanism 50 has the elastic member 65. The elastic member 65** may be a coil spring.

A pin 60 is disposed at +X ends of the arm 51 and the pusher 56. The pin 60 extends along the Z direction. The pin 60 has a body portion 61 and a head portion 62.

The body portion 61 is in a shape of a round bar. A first end on the +Z side of the body portion 61 is fixed to the arm connecting portion 53 by screwing or the like. The body portion 61 extends on the −Z side from the arm connecting portion 53 toward the pusher connecting portion 58. The pusher connecting portion 58 has a through hole 59 with a larger diameter than the body portion 61. The body portion 61 is inserted through the through hole 59 and extends to the −Z side of the pusher connecting portion 58.

The head portion 62 is located at a second end on the −Z side of the body portion 61. The head portion 62 has a larger diameter than the through hole 59.

The elastic member 65 is arranged coaxially with the body portion 61 of the pin 60. The elastic member 65 is arranged between the arm 51 and the pusher 56. In a compressed state, the elastic member 65 is arranged between the arm connecting portion 53 and the pusher connecting portion 58. The elastic member 65 biases the arm 51 in a direction in which the pressure roller 31 abuts against the heating roller 34.

The pressure roller 31 rotates around the pressure roller rotation shaft **31*c*. The elastic member 65 is on the same side (+X side) of the arm rotation shaft 51*c* as the pressure roller rotation shaft 31*c*. A distance D2 from the arm rotation shaft 51*c* to a central axis 65*c* of the elastic member 65 is greater than a distance D1 from the arm rotation shaft 51*c* to the pressure roller rotation shaft 31*c*. With this configuration, due to the principle of leverage, the pressure roller 31 is pressed against the heating roller 34 with a force greater than a biasing force of the elastic member 65**.

The cam follower 67 is located at a −X and +Z end of the pusher 56. As illustrated in FIG. 5, the cam follower 67 is disposed between a pair of pusher body plates 57 and 57. The cam follower 67 is a roller that can rotate around a cam follower rotation shaft 67*c* that is parallel to the Y direction.

The cam 70 is adjacent to the cam follower 67 and is on the +X side of the cam follower 67. A cam surface (outer peripheral surface) that forms the contour of the cam 70 can abut against an outer peripheral surface of the cam follower 67. The cam 70 of the first adjustment mechanism 50*a* and the cam 70 of the second adjustment mechanism 50*b* are connected by the camshaft 71. The camshaft 71 extends along the Y direction. The camshaft 71 is rotated by a motor or the like via a worm gear or the like. The cam 70 can rotate around a cam rotation shaft 70*c* in a direction of the arrow C. The cam rotation shaft 70*c* coincides with the rotation shaft of the camshaft 71.

Figure 7:
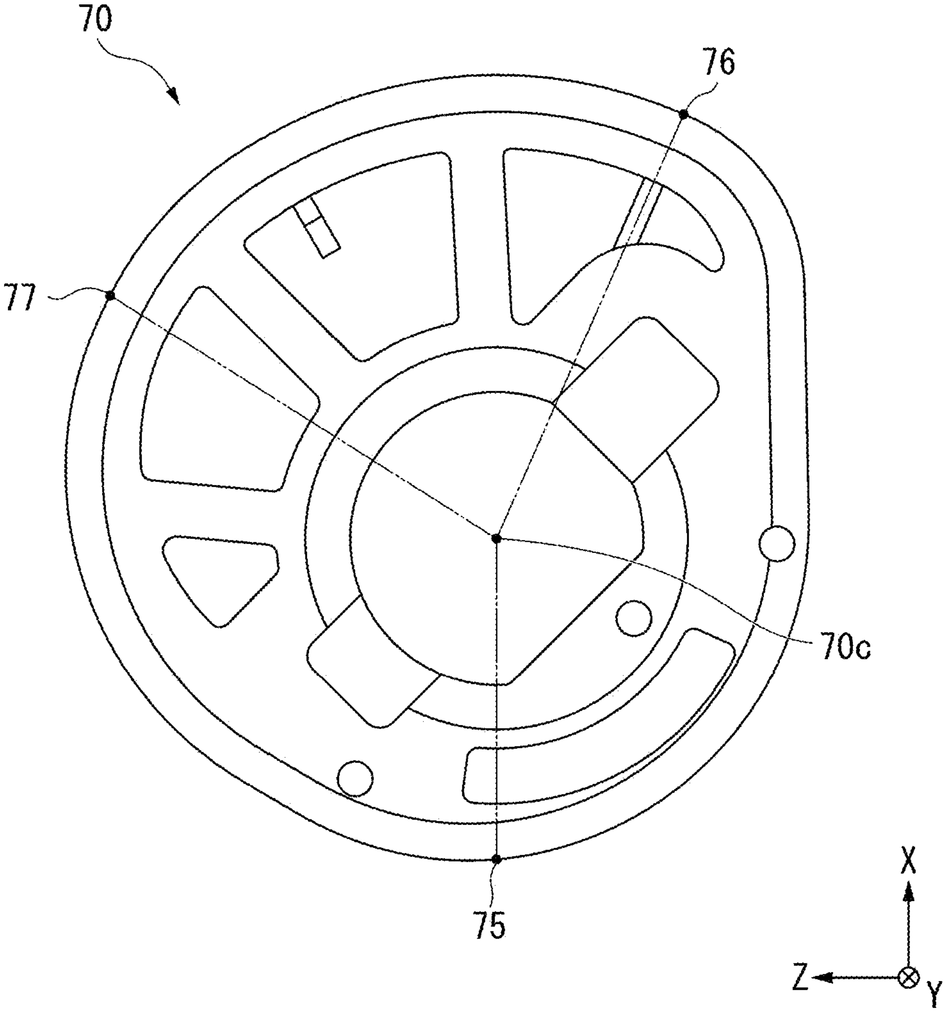
FIG. 7 is a front view of a cam.

FIG. 7 is a front view of the cam 70. The cam 70 has a spaced position 75, a first position 76, and a second position 77 on the cam surface. A distance (hereinafter, sometimes referred to as a cam diameter of each position) from the cam rotation shaft 70*c* to each position increases in the order of the spaced position 75, the second position 77, and the first position 76. The cam diameter changes continuously along a circumferential direction of the cam. The control section 6 rotates the camshaft 71 to bring each position of the cam 70 into contact with the cam follower 67.

The following describes movements of the pressure roller 31 away from and in contact with the heating roller 34.

When moving the pressure roller 31 away from the heating roller 34, the control section 6 brings the spaced position 75 of the cam 70 into contact with the cam follower 67.

When the pressure roller 31 is brought into contact with the heating roller 34, the control section 6 brings the first position 76 or the second position 77 of the cam 70 into contact with the cam follower 67. For example, the cam 70 rotates in a direction of the arrow C illustrated in FIG. 6. The cam 70 pushes the cam follower 67 in a direction of the arrow A. The pusher 56 supporting the cam follower 67 pivots around the arm rotation shaft 51*c* in the direction of the arrow A. The pusher connecting portion 58 pushes the arm connecting portion 53 to the +Z side via the elastic member 65. The arm 51 rotates around the arm rotation shaft 51*c* in the direction of the arrow A. The pressure roller 31 supported by the pressure roller support portion 54 of the arm 51 comes into contact with the heating roller 34.

When the cam 70 further rotates in the direction of the arrow C, the pusher 56 pivots around the arm rotation shaft 51*c* in the direction of the arrow A. The pusher connecting portion 58 moves away from the head portion 62 of the pin 60, compressing the elastic member 65. The elastic member 65 strongly presses the arm connecting portion 53 toward the +Z side. The arm 51 rotates around the arm rotation shaft 51*c* in the direction of arrow A. The pressure roller 31 is pressed toward the heating roller 34. As a result, the nip N is formed between the pressure roller 31 and the heating roller 34.

A pressing force of the pressure roller 31 against the heating roller 34 will be described.

The sheet S is supplied to the nip N of the fixing device 30 illustrated in FIG. 6. The fixing device 30 heats and pressurizes the toner on the sheet S to fix the toner to the sheet S. The toner in the fixing device 30 is pressed by the pressing force (hereinafter, sometimes simply referred to as a pressing force) of the pressure roller 31 against the heating roller 34. An appropriate pressing force for the fixing process is set by the cam diameters of the cam 70 at the first position 76 and the second position 77 (see FIG. 7), the elasticity of the elastic member 65, or the like. The appropriate pressing force is set when the rotation of the pressure roller 31 is stopped.

The fixing device 30 rotates the pressure roller 31 to transport the sheet S and perform the fixing process. When the pressure roller 31 rotates while forming the nip N, a force on the +Z side caused by the rotation of the pressure roller 31 acts on the heating roller 34 from the pressure roller 31. As a result, the pressing force of the pressure roller 31 on the heating roller 34 may exceed the appropriate pressing force for the fixing process. In particular, the higher the rotation speed of the pressure roller 31 is, the larger the +Z side force acting on the heating roller 34 is. Therefore, the possibility of exceeding the appropriate pressing force increases.

The control section 6 (see FIGS. 1 and 2) rotates the pressure roller 31 at a first speed or a second speed that is greater than the first speed. For example, when the sheet S is plain paper or thick paper, the control section 6 rotates the pressure roller 31 at the second speed. When the sheet S is extra thick paper, the control section 6 rotates the pressure roller 31 at the first speed.

The control section 6 controls the adjustment mechanism 50 so that a first pressing force is realized as the pressing force when the pressure roller 31 rotates at the first speed. The control section 6 rotates the camshaft 71 to bring the first position 76 (see FIG. 7) into contact with the cam follower 67. The first position 76 is a position where the first pressing force is realized. This realizes the first pressing force, which is the appropriate pressing force when the pressure roller 31 rotates at the first speed.

The control section 6 controls the adjustment mechanism 50 so that when the pressure roller 31 rotates at the second speed that is greater than the first speed, a second pressing force smaller than the first pressing force is realized as a pressing force. The control section 6 rotates the camshaft 71 to bring the second position 77 (see FIG. 7) into contact with the cam follower 67. The cam diameter at the second position 77 is smaller than the cam diameter at the first position 76. The second position 77 is a position that realizes the second pressing force. This realizes the second pressing force, which is the appropriate pressing force when the pressure roller 31 rotates at the second speed.

As described above in detail, the fixing device 30 of the embodiment has the cylindrical film 35, the pressure roller 31, the adjustment mechanism 50, and the control section 6. The pressure roller 31 can come into contact with the cylindrical film 35 to form the nip N. The adjustment mechanism 50 can adjust the pressing force of the pressure roller 31 against the cylindrical film 35. The control section 6 controls the adjustment mechanism 50 so that the first pressing force is realized as the pressing force when the pressure roller 31 rotates at the first speed. The control section 6 controls the adjustment mechanism 50 so that the second pressing force smaller than the first pressing force is realized as the pressing force when the pressure roller 31 rotates at the second speed greater than the first speed.

This achieves the first pressing force that is an appropriate pressing force when the pressure roller 31 rotates at the first speed. Furthermore, the second pressing force that is an appropriate pressing force when the pressure roller 31 rotates at the second speed is achieved. As a result, a component lifespan of the fixing device 30 can be extended. Furthermore, by performing the fixing process with an appropriate pressing force, the transfer (offset) of toner from the sheet S to the fixing device 30 is suppressed.

As illustrated in FIG. 4, the fixing device 30 has the drive unit DU for the pressure roller 31. The drive unit DU is arranged only on the +Y side of the pressure roller 31. The drive unit DU rotates the pressure roller 31 using a motor or the like. The pressing force on the +Y side of the pressure roller 31 where the drive unit DU is arranged is greater than the pressing force on the −Y side.

Figure 8:
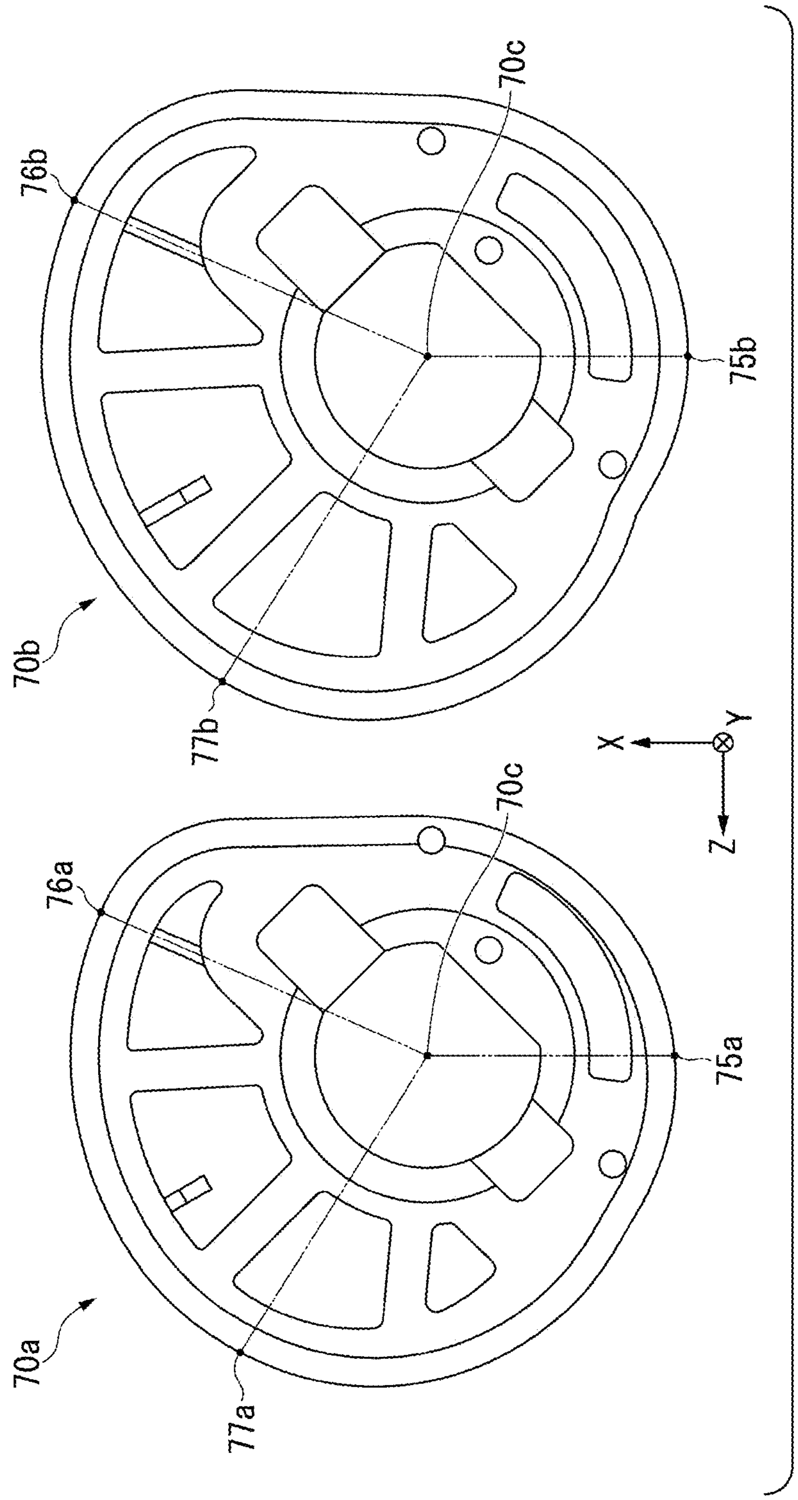
FIG. 8 is a front view of a first cam of a first adjustment mechanism and a second cam of the second adjustment mechanism.

FIG. 8 is a front view of a first cam 70*a* of the first adjustment mechanism 50*a* and a second cam 70*b* of the second adjustment mechanism 50*b*. As described above, the first adjustment mechanism 50*a* is disposed on the +Y side of the pressure roller 31, and the second adjustment mechanism 50*b* is disposed on the −Y side of the pressure roller 31. When the pressure roller 31 rotates at the second speed, a second position 77*a* of the first cam 70*a* and a fourth position 77*b* of the second cam 70*b* abut against the cam follower 67.

The second position 77*a* of the first cam 70*a* realizes the second pressing force on the +Y side of the pressure roller 31. The cam diameter of the fourth position 77*b* of the second cam 70*b* is larger than the cam diameter of the second position 77*a* of the first cam 70*a*. The fourth position 77*b* of the second cam 70*b* realizes a fourth pressing force larger than the second pressing force on the −Y side of the pressure roller 31. This makes the pressing force when the pressure roller 31 rotates at the second speed uniform in the Y direction. An appropriate pressing force is realized when the pressure roller 31 rotates at the second speed.

When the pressure roller 31 rotates at the second speed, a difference in pressing force between the +Y side and −Y side of the pressure roller 31 becomes larger. In contrast, when the pressure roller 31 rotates at the first speed which is slower than the second speed, the difference in pressing force between the +Y side and −Y side of the pressure roller 31 becomes smaller. When the pressure roller 31 rotates at the first speed, a first position 76*a* of the first cam 70*a* and a third position 76*b* of the second cam 70*b* abut against the cam follower 67.

The first position 76*a* of the first cam 70*a* realizes the first pressing force on the +Y side of the pressure roller 31. The cam diameter of the third position 76*b* of the second cam 70*b* is the same as the cam diameter of the first position 76*a* of the first cam 70*a*. The third position 76*b* of the second cam 70*b* realizes the first pressing force on the −Y side of the pressure roller 31, similar to the first position 76*a* of the first cam 70*a*. This realizes an appropriate pressing force when the pressure roller 31 rotates at the first speed.

As described above in detail, the fixing device 30 has the drive unit DU on the +Y side of the pressure roller 31 that rotates the pressure roller 31. A side opposite to the +Y side is the −Y side. The adjustment mechanism 50 has the first adjustment mechanism 50*a* and the second adjustment mechanism 50*b*. The first adjustment mechanism 50*a* adjusts the pressing force on the +Y side of the pressure roller 31. The second adjustment mechanism 50*b* adjusts the pressing force on the −Y side of the pressure roller 31. The first adjustment mechanism 50*a* realizes the second pressing force on the +Y side of the pressure roller 31 when the pressure roller 31 rotates at the second speed. The second adjustment mechanism 50*b* realizes the fourth pressing force greater than the second pressing force on the −Y side of the pressure roller 31 when the pressure roller 31 rotates at the second speed.

This makes the pressing force uniform in the Y direction when the pressure roller 31 rotates at the second speed. The appropriate pressing force is achieved when the pressure roller 31 rotates at the second speed. As a result, the component lifespan of the fixing device 30 can be extended. In addition, when the pressure roller 31 rotates at the second speed, displacement of the cylindrical film 35 to the −Y side is suppressed.

A first modification example of the embodiment will be described.

In the first modification example, the cam diameter at the third position 76*b* of the second cam 70*b* is larger than the cam diameter at the first position 76*a* of the first cam 70*a*. In this case, the third position 76*b* of the second cam 70*b* realizes the third pressing force greater than the first pressing force on the −Y side of the pressure roller 31. As a result, the pressing force when the pressure roller 31 rotates at the first speed becomes uniform in the Y direction. The difference between the third pressing force and the first pressing force is smaller than the difference between the fourth pressing force and the second pressing force. As a result, an appropriate pressing force is realized when the pressure roller 31 rotates at the first speed.

In this way, the first adjustment mechanism 50*a* of the first modification example realizes the first pressing force on the +Y side of the pressure roller 31 when the pressure roller 31 rotates at the first speed. The second adjustment mechanism 50*b* realizes the third pressing force greater than the first pressing force on the −Y side of the pressure roller 31 when the pressure roller 31 rotates at the first speed. The difference between the third pressing force and the first pressing force is smaller than the difference between the fourth pressing force and the second pressing force.

This makes the pressing force uniform in the Y direction when the pressure roller 31 rotates at the first speed. The appropriate pressing force is achieved when the pressure roller 31 rotates at the first speed. As a result, the component lifespan of the fixing device 30 can be extended. In addition, when the pressure roller 31 rotates at the first speed, displacement of the cylindrical film 35 to the −Y side is suppressed.

The adjustment mechanism 50 has the arm 51, the pusher 56, the elastic member 65, the cam follower 67, and the cam 70. The arm 51 rotatably supports the pressure roller 31 and changes the pressing force by pivoting. The pusher 56 is pivotable around the arm rotation shaft 51*c*. The elastic member 65 is located between the arm 51 and the pusher 56 and biases the arm 51 in a direction that increases the pressing force. The cam follower 67 is attached to the pusher 56. The cam 70 is rotatable around the cam rotation shaft 70*c*, and its outer circumferential surface can abut against the cam follower 67, pivoting the pusher 56 to change the pressing force.

The first cam 70*a* of the first adjustment mechanism 50*a* has the first position 76*a* that realizes the first pressing force and the second position 77*a* that realizes the second pressing force on its outer circumferential surface. The second cam 70*b* of the second adjustment mechanism 50*b* has the third position 76*b* that realizes the third pressing force and the fourth position 77*b* that realizes the fourth pressing force on its outer circumferential surface.

As a result, when the pressure roller 31 rotates at the first speed, the first pressing force is realized on the +Y side of the pressure roller 31, and the third pressing force is realized on the −Y side. Also, when the pressure roller 31 rotates at the second speed, the second pressing force is realized on the +Y side of the pressure roller 31, and the fourth pressing force is realized on the −Y side. As a result, an appropriate pressing force is realized by the pressure roller 31, and the component lifespan of the fixing device 30 can be extended.

A second modification example of the embodiment will be described.

The shape of the second cam 70*b* in the second modification example is the same as that of the first cam 70*a*. In the second modification example, the elastic force of a first elastic member 65*a* of the first adjustment mechanism 50*a* illustrated in FIG. 4 is smaller than the elastic force of a second elastic member 65*b* of the second adjustment mechanism 50*b*. When the elastic member 65 is a coil spring, the spring constant of the first coil spring 65*a* is smaller than the spring constant of the second coil spring 65*b*. As a result, the pressing force on the +Y side of the pressure roller 31 is smaller than the pressing force on the −Y side.

When the pressure roller 31 rotates at the first speed, the first position 76*a* of the first cam 70*a* and the third position 76*b* of the second cam 70*b* abut against the cam follower 67. The elastic force of the first elastic member 65*a* of the first adjustment mechanism 50*a* realizes the first pressing force on the +Y side of the pressure roller 31 when the pressure roller 31 rotates at the first speed. The elastic force of the second elastic member 65*b* of the second adjustment mechanism 50*b* realizes the third pressing force greater than the first pressing force on the −Y side of the pressure roller 31 when the pressure roller 31 rotates at the first speed. This realizes an appropriate pressing force when the pressure roller 31 rotates at the first speed.

When the pressure roller 31 rotates at the second speed, the second position 77*a* of the first cam 70*a* and the fourth position 77*b* of the second cam 70*b* abut against the cam follower 67. The elastic force of the first elastic member 65*a* of the first adjustment mechanism 50*a* realizes the second pressing force smaller than the first pressing force on the +Y side of the pressure roller 31 when the pressure roller 31 rotates at the second speed. The elastic force of the second elastic member 65*b* of the second adjustment mechanism 50*b* realizes the fourth pressing force larger than the second pressing force on the −Y side of the pressure roller 31 when the pressure roller 31 rotates at the second speed. This realizes an appropriate pressing force when the pressure roller 31 rotates at the second speed.

A third modification example of the embodiment will be described.

The shape of the second cam 70*b* in the third modification example is the same as the first cam 70*a*. As illustrated in FIG. 6, the pressure roller 31 is supported by the pressure roller support portion 54 of the arm 51. A distance from a central axis 34*c* of the heating roller 34 to a position where the arm 51 supports the pressure roller 31 is called a support position distance. In the third modification example, the support position distance of the first adjustment mechanism 50*a* is greater than the support position distance of the second adjustment mechanism 50*b*. As a result, the pressing force on the +Y side of the pressure roller 31 is smaller than the pressing force on the −Y side.

When the pressure roller 31 rotates at the first speed, the first position 76*a* of the first cam 70*a* and the third position 76*b* of the second cam 70*b* abut against the cam follower 67. The support position distance of the first adjustment mechanism 50*a* realizes the first pressing force on the +Y side of the pressure roller 31 when the pressure roller 31 rotates at the first speed. The support position distance of the second adjustment mechanism 50*b* realizes the third pressing force greater than the first pressing force on the −Y side of the pressure roller 31 when the pressure roller 31 rotates at the first speed. This realizes an appropriate pressing force when the pressure roller 31 rotates at the first speed.

When the pressure roller 31 rotates at the second speed, the second position 77*a* of the first cam 70*a* and the fourth position 77*b* of the second cam 70*b* abut against the cam follower 67. The support position distance of the first adjustment mechanism 50*a* realizes the second pressing force smaller than the first pressing force on the +Y side of the pressure roller 31 when the pressure roller 31 rotates at the second speed. The support position distance of the second adjustment mechanism 50*b* realizes the fourth pressing force larger than the second pressing force on the −Y side of the pressure roller 31 when the pressure roller 31 rotates at the second speed. This realizes an appropriate pressing force when the pressure roller 31 rotates at the second speed.

A fourth modification example of the embodiment will be described.

The shape of the second cam 70*b* in the fourth modification example is the same as that of the first cam 70*a*. In the fourth modification example, hardness of the pressure roller 31 on the +Y side is greater than hardness on the −Y side. Specifically, the diameter of the core metal 32 of the pressure roller 31 illustrated in FIG. 3 on the +Y side is greater than the diameter on the −Y side. A thickness of the elastic layer 33 of the pressure roller 31 on the +Y side is smaller than a thickness on the −Y side.

In the fourth modification example, an amount of deformation of the pressure roller 31 on the +Y side in the nip N is smaller than an amount of deformation on the −Y side. This makes it possible to suppress displacement of the cylindrical film 35 on the −Y side.

The shape of the second cam 70*b* in the second to fourth modification examples is the same as the first cam 70*a*. In contrast, as in the embodiment or first modification example described above, the shape of the second cam 70*b* may be different from the shape of the first cam 70*a*. The contents of the embodiment and the first to fourth modification examples may be implemented in multiple forms simultaneously.

In the fixing device 30 of the embodiment illustrated in FIG. 3, the heat generating unit 40 arranged inside the cylindrical film 35 heats the cylindrical film 35. The heat generating unit 40 is a sliding member that slides against the cylindrical film 35. The heat generating unit 40 forms the nip N by pinching the cylindrical film 35 between itself and the pressure roller 31.

Alternatively, the fixing device 30 may be one in which an IH induction coil arranged on the outside of the cylindrical film 35 heats the cylindrical film 35 by magnetic induction. In this case, a pressure pad arranged on the inside of the cylindrical film 35 becomes a sliding member that slides against the cylindrical film 35. The pressure pad forms the nip N between itself and the pressure roller 31, pinching the cylindrical film 35.

Figure 9:
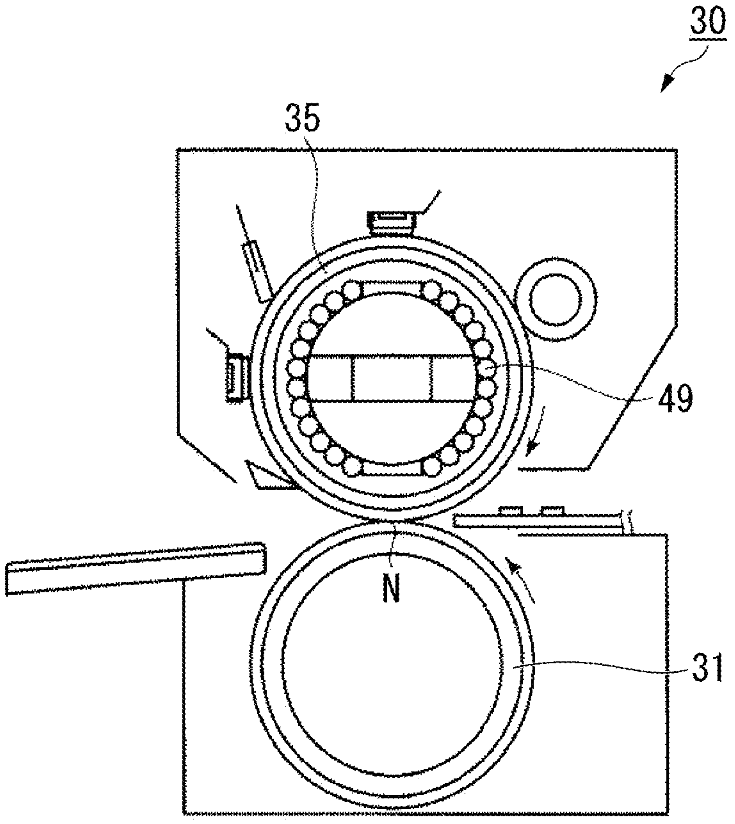
FIG. 9 is a front cross-sectional view of a fixing device having an induction heating coil inside a cylindrical body.

FIG. 9 is a front cross-sectional view of the fixing device 30 having an induction heating coil 49 inside the cylindrical body 35. The fixing device 30 may be one in which the induction heating coil 49 arranged inside the cylindrical body 35 heats the cylindrical body 35. In this case, the cylindrical body 35 is a rigid body and forms the nip N with the pressure roller 31. This fixing device 30 does not have a member that slides with the cylindrical body 35 on an opposite side of the pressure roller 31 across the nip N of the cylindrical body 35.

APPENDIX 1

A fixing device, comprising:

a cylindrical body;

a pressure roller capable of coming in contact with the cylindrical body to form a nip;

an adjustment mechanism capable of adjusting a pressing force of the pressure roller against the cylindrical body; and a control section for controlling the adjustment mechanism so that a first pressing force is realized as the pressing force when the pressure roller rotates at a first speed, and a second pressing force smaller than the first pressing force is realized as the pressing force when the pressure roller rotates at a second speed greater than the first speed.

APPENDIX 2

The device according to appendix 1, where a drive unit is provided on a first side of the pressure roller in an axial direction to rotate the pressure roller, when a side opposite to the first side in the axial direction is defined as a second side in the axial direction, the adjustment mechanism includes a first adjustment mechanism that adjusts the pressing force on the first side in the axial direction of the pressure roller, and a second adjustment mechanism that adjusts the pressing force on the second side in the axial direction of the pressure roller, the first adjustment mechanism realizes the second pressing force on the first side in the axial direction of the pressure roller when the pressure roller rotates at the second speed, and the second adjustment mechanism realizes a fourth pressing force greater than the second pressing force on the second side in the axial direction of the pressure roller when the pressure roller rotates at the second speed.

APPENDIX 3

The device according to appendix 2, where the first adjustment mechanism realizes the first pressing force on the first side in the axial direction of the pressure roller when the pressure roller rotates at the first speed, the second adjustment mechanism realizes a third pressing force greater than the first pressing force on the second side in the axial direction of the pressure roller when the pressure roller rotates at the first speed, and a difference between the third pressing force and the first pressing force is smaller than a difference between the fourth pressing force and the second pressing force.

APPENDIX 4

The device according to appendix 3, where the adjustment mechanism includes, an arm that rotatably supports the pressure roller and changes the pressing force by pivoting, a pusher that is pivotable around a pivot axis of the arm, an elastic member disposed between the arm and the pusher and biasing the arm in a direction in which the pressing force increases, a cam follower attached to the pusher, and a cam that is rotatable around a rotation shaft, has an outer circumferential surface that can abut against the cam follower, and pivots the pusher to change the pressing force.

APPENDIX 5

The device according to appendix 4, where an elastic force of the elastic member in the first adjustment mechanism is smaller than an elastic force of the elastic member in the second adjustment mechanism.

APPENDIX 6

The device according to appendix 4, where the cam of the first adjustment mechanism has a first position for realizing the first pressing force and a second position for realizing the second pressing force on the outer circumferential surface, and the cam of the second adjustment mechanism has a third position for realizing the third pressing force and a fourth position for realizing the fourth pressing force on the outer circumferential surface.

APPENDIX 7

The device according to appendix 4, where a distance from a central axis of the cylindrical body to a position where the arm of the first adjustment mechanism supports the pressure roller is greater than a distance from a central axis of the cylindrical body to a position where the arm of the second adjustment mechanism supports the pressure roller.

APPENDIX 8

The device according to appendix 4, where hardness of the pressure roller at the first side in the axial direction is greater than hardness of the pressure roller at the second side in the axial direction.

APPENDIX 9

The device according to any one of appendices 1 to 8, where a sliding member that slides relative to the cylindrical body and pinches the cylindrical body between the sliding member and the pressure roller to form the nip is provided.

APPENDIX 10

The device according to any one of appendices 1 to 8, where a member is not provided that slides with the cylindrical body on an opposite side of the pressure roller with the nip of the cylindrical body 35 therebetween.

According to at least one of the embodiments described above, the apparatus has the control section 6 that controls the adjustment mechanism 50. The control section 6 controls the adjustment mechanism 50 so that the second pressing force smaller than the first pressing force is realized as the pressing force when the pressure roller 31 rotates at the second speed greater than the first speed. This makes it possible to extend the component lifespan of the fixing device 30.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A fixing device, comprising:

a cylindrical body;

a pressure roller configured to contact the cylindrical body to form a nip;

an adjustment mechanism configured to adjust a pressing force of the pressure roller against the cylindrical body; and a control section for controlling the adjustment mechanism so that a first pressing force is realized as the pressing force when the pressure roller rotates at a first speed, and a second pressing force smaller than the first pressing force is realized as the pressing force when the pressure roller rotates at a second speed greater than the first speed, wherein a drive component is provided on a first side of the pressure roller in an axial direction to rotate the pressure roller, when a side opposite to the first side in the axial direction is defined as a second side in the axial direction, the adjustment mechanism includes a first adjustment mechanism that adjusts the pressing force on the first side in the axial direction of the pressure roller, and a second adjustment mechanism that adjusts the pressing force on the second side in the axial direction of the pressure roller, the first adjustment mechanism realizes the second pressing force on the first side in the axial direction of the pressure roller when the pressure roller rotates at the second speed, and the second adjustment mechanism realizes a fourth pressing force greater than the second pressing force on the second side in the axial direction of the pressure roller when the pressure roller rotates at the second speed.

2. The fixing device according to claim 1, wherein the first adjustment mechanism realizes the first pressing force on the first side in the axial direction of the pressure roller when the pressure roller rotates at the first speed, the second adjustment mechanism realizes a third pressing force greater than the first pressing force on the second side in the axial direction of the pressure roller when the pressure roller rotates at the first speed, and a difference between the third pressing force and the first pressing force is smaller than a difference between the fourth pressing force and the second pressing force.

3. The fixing device according to claim 2, wherein the adjustment mechanism includes:

an arm that rotatably supports the pressure roller and changes the pressing force by pivoting, a pusher pivotable around a pivot axis of the arm, an elastic member disposed between the arm and the pusher and biasing the arm in a direction in which the pressing force increases, a cam follower attached to the pusher, and a cam rotatable around a rotation shaft, having an outer circumferential surface that is configured to abut against the cam follower, and pivots the pusher to change the pressing force.

4. The fixing device according to claim 3, wherein an elastic force of the elastic member in the first adjustment mechanism is smaller than an elastic force of the elastic member in the second adjustment mechanism.

5. The fixing device according to claim 1, wherein the cylindrical body comprises a heating roller configured to heat a toner image on a sheet that enters the nip.

6. The fixing device according to claim 1, wherein the cylindrical body comprises a cylindrical film, a heat generating component, a heat transfer member, and at least one temperature-sensing element.

7. An image forming apparatus, comprising:

a scanner section;

a sheet supply section;

a conveying section;

a reversing component;

a control panel; and an image forming section comprising:

a fixing device, comprising:

a cylindrical body;

a pressure roller configured to contact the cylindrical body to form a nip;

an adjustment mechanism configured to adjust a pressing force of the pressure roller against the cylindrical body; and a control section for controlling the adjustment mechanism so that a first pressing force is realized as the pressing force when the pressure roller rotates at a first speed, and a second pressing force smaller than the first pressing force is realized as the pressing force when the pressure roller rotates at a second speed greater than the first speed, wherein a drive component is provided on a first side of the pressure roller in an axial direction to rotate the pressure roller, when a side opposite to the first side in the axial direction is defined as a second side in the axial direction, the adjustment mechanism includes a first adjustment mechanism that adjusts the pressing force on the first side in the axial direction of the pressure roller, and a second adjustment mechanism that adjusts the pressing force on the second side in the axial direction of the pressure roller, the first adjustment mechanism realizes the second pressing force on the first side in the axial direction of the pressure roller when the pressure roller rotates at the second speed, and the second adjustment mechanism realizes a fourth pressing force greater than the second pressing force on the second side in the axial direction of the pressure roller when the pressure roller rotates at the second speed.

8. The image forming apparatus according to claim 7, wherein the first adjustment mechanism realizes the first pressing force on the first side in the axial direction of the pressure roller when the pressure roller rotates at the first speed, the second adjustment mechanism realizes a third pressing force greater than the first pressing force on the second side in the axial direction of the pressure roller when the pressure roller rotates at the first speed, and a difference between the third pressing force and the first pressing force is smaller than a difference between the fourth pressing force and the second pressing force.

9. The image forming apparatus according to claim 8, wherein the adjustment mechanism includes:

an arm that rotatably supports the pressure roller and changes the pressing force by pivoting, a pusher pivotable around a pivot axis of the arm, an elastic member disposed between the arm and the pusher and biasing the arm in a direction in which the pressing force increases, a cam follower attached to the pusher, and a cam rotatable around a rotation shaft, having an outer circumferential surface that is configured to abut against the cam follower, and pivots the pusher to change the pressing force.

10. The image forming apparatus according to claim 9, wherein an elastic force of the elastic member in the first adjustment mechanism is smaller than an elastic force of the elastic member in the second adjustment mechanism.

11. The image forming apparatus according to claim 7, wherein the cylindrical body comprises a heating roller configured to heat a toner image on a sheet that enters the nip.

12. The image forming apparatus according to claim 7, wherein the cylindrical body comprises a cylindrical film, a heat generating component, a heat transfer member, and at least one temperature-sensing element.

13. A method for operating a fixing device, comprising:

contacting a cylindrical body with a pressure roller to form a nip;

adjusting a pressing force of the pressure roller against the cylindrical body; and controlling the adjusting so that a first pressing force is realized as the pressing force when the pressure roller rotates at a first speed, and a second pressing force smaller than the first pressing force is realized as the pressing force when the pressure roller rotates at a second speed greater than the first speed, wherein a drive component is provided on a first side of the pressure roller in an axial direction to rotate the pressure roller, when a side opposite to the first side in the axial direction is defined as a second side in the axial direction, adjusting comprises a first adjusting that adjusts the pressing force on the first side in the axial direction of the pressure roller, and a second adjusting that adjusts the pressing force on the second side in the axial direction of the pressure roller, the first adjusting realizes the second pressing force on the first side in the axial direction of the pressure roller when the pressure roller rotates at the second speed, and the second adjusting realizes a fourth pressing force greater than the second pressing force on the second side in the axial direction of the pressure roller when the pressure roller rotates at the second speed.

14. The method according to claim 13, wherein the first adjusting realizes the first pressing force on the first side in the axial direction of the pressure roller when the pressure roller rotates at the first speed, the second adjusting realizes a third pressing force greater than the first pressing force on the second side in the axial direction of the pressure roller when the pressure roller rotates at the first speed, and a difference between the third pressing force and the first pressing force is smaller than a difference between the fourth pressing force and the second pressing force.

15. The method according to claim 14, wherein the adjusting includes:

supporting the pressure roller and changing the pressing force by pivoting an arm rotatably using a mechanism comprising:

a pusher pivotable around a pivot axis of the arm, an elastic member disposed between the arm and the pusher and biasing the arm in a direction in which the pressing force increases, a cam follower attached to the pusher, and a cam rotatable around a rotation shaft, having an outer circumferential surface that is configured to abut against the cam follower, and pivots the pusher to change the pressing force.

16. The method according to claim 15, wherein an elastic force of the elastic member in the first adjustment mechanism is smaller than an elastic force of the elastic member in the second adjustment mechanism.

17. The method according to claim 13, further comprising:

heating a toner image on a sheet that enters the nip with a heating roller.

* * * * *